July 21, 1931.   A. H. SCHMAL   1,815,450
STEERING GEAR ADJUSTING DEVICE

Filed May 24, 1930

Inventor:
Alois H. Schmal
By his Attorneys
Redding, Greeley, O'Shea & Campbell

Patented July 21, 1931

1,815,450

UNITED STATES PATENT OFFICE

ALOIS H. SCHMAL, OF RAHWAY, NEW JERSEY, ASSIGNOR TO INTERNATIONAL MOTOR COMPANY, OF NEW YORK, N. Y., A CORPORATION OF DELAWARE

STEERING GEAR ADJUSTING DEVICE

Application filed May 24, 1930. Serial No. 455,200.

The present invention relates to steering mechanisms and embodies, more specifically, an improved steering mechanism by means of which the desired adjustment between the steering column and associated steering elements is provided.

In steering mechanisms, particularly of the worm and sector type, it is desirable to adjust the cooperating moving parts thereof from time to time to compensate for wear, as well as to serve as an initial adjustment when the parts are assembled.

In existing types of steering mechanisms, although provision has been made for such adjustment, the structure has not included an effective means for mounting and securing the parts conveniently in adjusted position. The present invention seeks to overcome conditions of this character and to afford a highly effective and simple device for adjusting the cooperating portions of a steering mechanism readily.

An object of the invention, accordingly, is to provide a device for effecting an adjustment between the driving or power transmitting portions of a steering mechanism.

A further object of the invention is to provide a device for effectively adjusting the distance between adjacent portions of a steering mechanism, the axes of which are not coaxial.

A further object of the invention is to provide a device for readily adjusting the relative positions of a worm and sector in a steering mechanism.

A further object of the invention is to provide a device of simple construction by means of which a sector may be adjusted with respect to its driving worm in a steering mechanism.

Further objects, not specifically enumerated above, will be apparent as the invention is described in greater detail in connection with the accompanying drawings, wherein.

Figure 1:
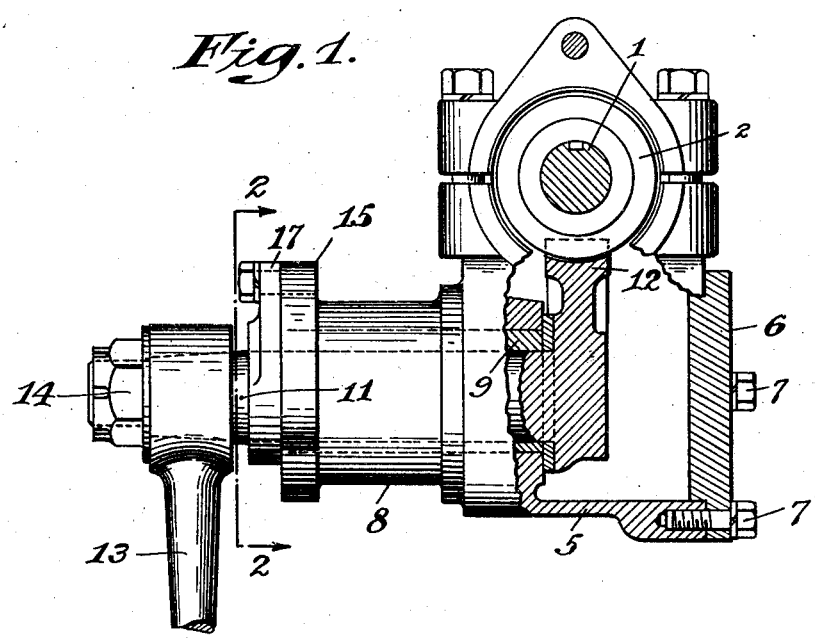
Figure 1 is a view in front elevation, partly broken away and in section showing a steering mechanism constructed in accordance with the present invention.
Figure 2:
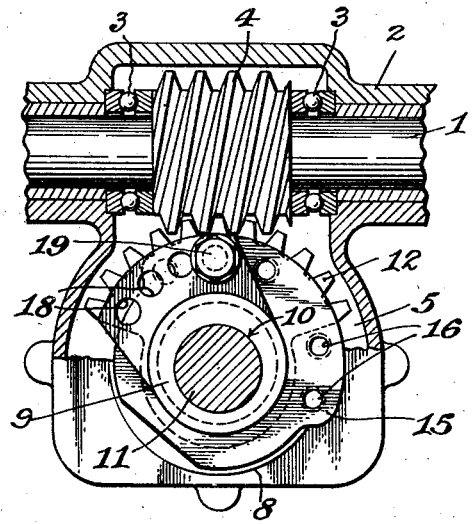
Figure 2 is a view in section, taken on line 2—2 of Figure 1, and looking in the direction of the arrows, the parts being broken away and in section in the interest of clearness.
Figure 3:
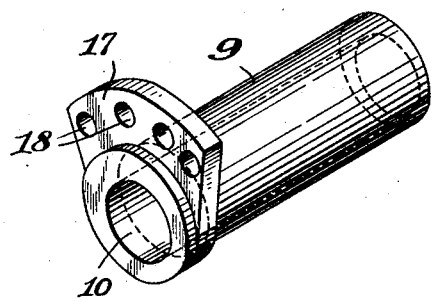
Figure 3 is a detail view showing the eccentric element by means of which adjustment is effected in accordance with the present invention.

Referring to the above drawings, a steering column is shown at 1 being mounted in a housing 2 by means of bearings 3. These bearings are preferably of the thrust type and are separated by means of a worm 4. Housing 2 is formed with an enlarged portion 5 which is closed by means of a plate 6, the latter being secured in position by means of bolts 7. The housing 5 is formed in a cylindrical extension 8 within which a bushing 9 is journaled.

The bushing 9 is formed with an eccentric axially hollow portion 10 within which sector shaft 11 is journaled. The sector shaft carries a sector 12 which engages with worm 4 and transmits the movement of steering column 1 to a steering arm 13. Nut 14 may be provided to secure the arm to shaft 11 in a well known fashion.

About the outer extremity of sleeve 8, a peripheral flange 15 is provided, threaded recesses 16 being provided in the flange 15 adjacent the periphery thereof. A flanged extension 17 is formed on the outer extremity of the bushing 9 and is likewise formed with apertures 18 adjacent its periphery, these apertures preferably being spaced coaxially with respect to the apertures 16. A bolt 19 is provided for engaging the threads of the apertures 16, thus permitting the bushing 9 to be secured within the sleeve 8 in a plurality of angular positions with respect thereto.

From the foregoing, it will be seen that rotation of the bushing 9 within sleeve 8 causes the sector shaft 11 to be advanced or retracted from the axis of steering column 1, thus causing a corresponding movement of the sector 12. In this manner, the adjustment of the pitch line of the worm and sector is readily effected.

While the invention has been described with specific reference to the accompanying drawings, it is not to be limited, save as defined in the appended claim.

I claim as my invention:

A housing, a driving shaft journaled in the housing and provided with a worm, a driven shaft, a sector on the driven shaft engaging the worm, a cylindrical sleeve on the housing, a bushing in the sleeve formed with an eccentric bore and lying on one side of the sector, a flange on the sleeve formed with a plurality of threaded apertures adjacent the periphery thereof, a flange on the bushing formed with apertures spaced coaxially with the first apertures, means engaging the apertures to secure the flanges together in a desired position, and means to journal the second shaft in the bushing.

This specification signed this 20th day of May A. D. 1930.

ALOIS H. SCHMAL.